US008358189B2

(12) United States Patent
Kaessner et al.

(10) Patent No.: US 8,358,189 B2
(45) Date of Patent: Jan. 22, 2013

(54) METHOD AND APPARATUS FOR ACTIVATING AN ELECTRIC MACHINE, AND ELECTRIC MACHINE

(75) Inventors: Thomas Kaessner, Dresden (DE); Alessandro Fasolo, Vipiteno (IT)

(73) Assignee: Willic S.AR.L., Luxembourg (LU)

( * ) Notice: Subject to any disclaimer, the term of this patent is extended or adjusted under 35 U.S.C. 154(b) by 225 days.

(21) Appl. No.: 12/851,782

(22) Filed: Aug. 6, 2010

(65) Prior Publication Data

US 2011/0187218 A1    Aug. 4, 2011

(30) Foreign Application Priority Data

Aug. 7, 2009   (IT) ............................. MI2009A1443

(51) Int. Cl.
*H01F 13/00* (2006.01)
*H02K 15/03* (2006.01)
(52) U.S. Cl. .............. 335/284; 29/598; 29/607; 310/46; 310/48; 310/112; 290/55
(58) Field of Classification Search .................. 335/284; 310/46, 48, 112; 290/55; 29/596, 607, 598, 29/609
See application file for complete search history.

(56) References Cited

U.S. PATENT DOCUMENTS

| | | | |
|---|---|---|---|
| 1,894,357 A | 1/1933 | Manikowske et al. | |
| 1,948,854 A | 2/1934 | Heath | |
| 1,979,813 A | 11/1934 | Reis | |
| 2,006,172 A | 6/1935 | Klappauf | |
| 2,040,218 A | 5/1936 | Soderberg | |
| 2,177,801 A | 10/1939 | Erren | |
| 2,469,734 A | 5/1949 | Ledwith | |
| 2,496,897 A | 2/1950 | Strickland | |
| 2,655,611 A | 10/1953 | Sherman | |
| 2,739,253 A | 3/1956 | Plumb | |
| 2,754,440 A * | 7/1956 | Brainard | 310/156.51 |
| 2,806,160 A | 9/1957 | Brainard | |
| 2,842,214 A | 7/1958 | Prewitt | |
| 2,903,610 A | 9/1959 | Bessiere | |
| 3,004,782 A | 10/1961 | Meermans | |
| 3,072,813 A | 1/1963 | Reijnst et al. | |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Burton Mullins
(74) *Attorney, Agent, or Firm* — Neal, Gerber & Eisenberg LLP

(57) ABSTRACT

A method of activating an electric machine having a stator, and a rotor which rotates about an axis with respect to the stator; the stator having a plurality of stator segments arranged about the axis; the rotor having modules made of magnetizable material and arranged about the axis; and the method including the steps of connecting the rotor to the stator by means of a bearing; and magnetizing the modules of magnetizable material when the rotor is connected to the stator.

33 Claims, 3 Drawing Sheets

U.S. PATENT DOCUMENTS

| | | | |
|---|---|---|---|
| 3,083,311 A | 3/1963 | Krasnow | |
| 3,131,942 A | 5/1964 | Ertaud | |
| 3,168,686 A | 2/1965 | King et al. | |
| 3,221,195 A | 11/1965 | Hoffmann | |
| 3,363,910 A | 1/1968 | Toronchuk | |
| 3,364,523 A | 1/1968 | Schippers | |
| 3,392,910 A | 7/1968 | Tanzberger | |
| 3,468,548 A | 9/1969 | Webb | |
| 3,678,436 A * | 7/1972 | Herdrich et al. | 335/284 |
| 3,700,247 A | 10/1972 | Butler et al. | |
| 3,724,861 A | 4/1973 | Lesiecki | |
| 3,746,349 A | 7/1973 | Smale et al. | |
| 3,748,089 A | 7/1973 | Boyer et al. | |
| 3,789,252 A | 1/1974 | Abegg | |
| 3,841,643 A | 10/1974 | McLean | |
| 3,860,843 A | 1/1975 | Kawasaki et al. | |
| 3,942,026 A | 3/1976 | Carter | |
| 3,963,247 A | 6/1976 | Nommensen | |
| 3,968,969 A | 7/1976 | Mayer et al. | |
| 4,022,479 A | 5/1977 | Orlowski | |
| 4,061,926 A | 12/1977 | Peed | |
| 4,087,698 A | 5/1978 | Myers | |
| 4,273,343 A | 6/1981 | Visser | |
| 4,289,970 A | 9/1981 | Deibert | |
| 4,291,235 A | 9/1981 | Bergey, Jr. et al. | |
| 4,292,532 A | 9/1981 | Leroux | |
| 4,336,649 A | 6/1982 | Glaser | |
| 4,339,874 A | 7/1982 | Mc'Carty et al. | |
| 4,348,604 A | 9/1982 | Thode | |
| 4,350,897 A | 9/1982 | Benoit | |
| 4,354,126 A | 10/1982 | Yates | |
| 4,368,895 A | 1/1983 | Okamoto et al. | |
| 4,398,773 A | 8/1983 | Boden et al. | |
| 4,452,046 A | 6/1984 | Valentin | |
| 4,482,831 A | 11/1984 | Notaras et al. | |
| 4,490,093 A | 12/1984 | Chertok et al. | |
| 4,517,483 A | 5/1985 | Hucker et al. | |
| 4,517,484 A | 5/1985 | Dacier | |
| 4,521,026 A | 6/1985 | Eide | |
| 4,585,950 A | 4/1986 | Lund | |
| 4,613,779 A | 9/1986 | Meyer | |
| 4,638,200 A | 1/1987 | Le Corre et al. | |
| 4,648,801 A | 3/1987 | Wilson | |
| 4,694,654 A | 9/1987 | Kawamura | |
| 4,700,096 A | 10/1987 | Epars | |
| 4,714,852 A | 12/1987 | Kawada et al. | |
| 4,720,640 A | 1/1988 | Anderson et al. | |
| 4,722,661 A | 2/1988 | Mizuno | |
| 4,724,348 A | 2/1988 | Stokes | |
| 4,761,590 A | 8/1988 | Kaszman | |
| 4,792,712 A | 12/1988 | Stokes | |
| 4,801,244 A | 1/1989 | Stahl | |
| 4,866,321 A | 9/1989 | Blanchard et al. | |
| 4,900,965 A | 2/1990 | Fisher | |
| 4,906,060 A | 3/1990 | Claude | |
| 4,973,868 A | 11/1990 | Wust | |
| 4,976,587 A | 12/1990 | Johnston et al. | |
| 5,004,944 A | 4/1991 | Fisher | |
| 5,063,318 A | 11/1991 | Anderson | |
| 5,090,711 A | 2/1992 | Becker | |
| 5,091,668 A | 2/1992 | Cuenot et al. | |
| 5,177,388 A | 1/1993 | Hotta et al. | |
| 5,191,255 A | 3/1993 | Kloosterhouse et al. | |
| 5,275,139 A | 1/1994 | Rosenquist | |
| 5,280,209 A | 1/1994 | Leupold et al. | |
| 5,281,094 A | 1/1994 | McCarty et al. | |
| 5,298,827 A | 3/1994 | Sugiyama | |
| 5,302,876 A | 4/1994 | Iwamatsu et al. | |
| 5,311,092 A | 5/1994 | Fisher | |
| 5,315,159 A | 5/1994 | Gribnau | |
| 5,331,238 A | 7/1994 | Johnsen | |
| 5,410,997 A | 5/1995 | Rosenquist | |
| 5,419,683 A | 5/1995 | Peace | |
| 5,456,579 A | 10/1995 | Olson | |
| 5,483,116 A | 1/1996 | Kusase et al. | |
| 5,506,453 A | 4/1996 | McCombs | |
| 5,579,800 A | 12/1996 | Walker | |
| 5,609,184 A | 3/1997 | Apel et al. | |
| 5,663,600 A | 9/1997 | Baek et al. | |
| 5,670,838 A | 9/1997 | Everton | |
| 5,696,419 A | 12/1997 | Rakestraw et al. | |
| 5,704,567 A | 1/1998 | Maglieri | |
| 5,746,576 A | 5/1998 | Bayly | |
| 5,777,952 A | 7/1998 | Nishimura et al. | |
| 5,783,894 A | 7/1998 | Wither | |
| 5,793,144 A | 8/1998 | Kusase et al. | |
| 5,798,632 A | 8/1998 | Muljadi | |
| 5,801,470 A | 9/1998 | Johnson et al. | |
| 5,811,908 A | 9/1998 | Iwata et al. | |
| 5,814,914 A | 9/1998 | Caamaño | |
| 5,844,333 A | 12/1998 | Sheerin | |
| 5,844,341 A | 12/1998 | Spooner et al. | |
| 5,857,762 A | 1/1999 | Schwaller | |
| 5,886,441 A | 3/1999 | Uchida et al. | |
| 5,889,346 A | 3/1999 | Uchida et al. | |
| 5,894,183 A | 4/1999 | Borchert | |
| 5,925,964 A | 7/1999 | Kusase et al. | |
| 5,952,755 A | 9/1999 | Lubas | |
| 5,961,124 A | 10/1999 | Muller | |
| 5,973,435 A | 10/1999 | Irie et al. | |
| 5,986,374 A | 11/1999 | Kawakami | |
| 5,986,378 A | 11/1999 | Caamaño | |
| 6,013,968 A | 1/2000 | Lechner et al. | |
| 6,037,692 A | 3/2000 | Miekka et al. | |
| 6,064,123 A | 5/2000 | Gislason | |
| 6,067,227 A | 5/2000 | Katsui et al. | |
| 6,089,536 A | 7/2000 | Watanabe et al. | |
| 6,093,984 A | 7/2000 | Shiga et al. | |
| 6,127,739 A | 10/2000 | Appa | |
| 6,172,429 B1 | 1/2001 | Russell | |
| 6,177,746 B1 | 1/2001 | Tupper et al. | |
| 6,193,211 B1 | 2/2001 | Watanabe et al. | |
| 6,194,799 B1 | 2/2001 | Miekka et al. | |
| 6,215,199 B1 | 4/2001 | Lysenko et al. | |
| 6,232,673 B1 | 5/2001 | Schoo et al. | |
| 6,278,197 B1 | 8/2001 | Appa | |
| 6,285,090 B1 | 9/2001 | Brutsaert et al. | |
| 6,326,711 B1 | 12/2001 | Yamaguchi et al. | |
| 6,365,994 B1 | 4/2002 | Watanabe et al. | |
| 6,373,160 B1 | 4/2002 | Schrödl | |
| 6,376,956 B1 | 4/2002 | Hosoya | |
| 6,378,839 B2 | 4/2002 | Watanabe et al. | |
| 6,384,504 B1 | 5/2002 | Elrhart et al. | |
| 6,417,578 B1 | 7/2002 | Chapman et al. | |
| 6,428,011 B1 | 8/2002 | Oskouei | |
| 6,452,287 B1 | 9/2002 | Looker | |
| 6,452,301 B1 | 9/2002 | Van Dine et al. | |
| 6,455,976 B1 | 9/2002 | Nakano | |
| 6,472,784 B2 | 10/2002 | Miekka et al. | |
| 6,474,653 B1 | 11/2002 | Hintenlang et al. | |
| 6,476,513 B1 | 11/2002 | Gueorguiev | |
| 6,483,199 B2 | 11/2002 | Umemoto et al. | |
| 6,492,743 B1 | 12/2002 | Appa | |
| 6,492,754 B1 | 12/2002 | Weiglhofer et al. | |
| 6,499,532 B1 | 12/2002 | Williams | |
| 6,504,260 B1 | 1/2003 | Debleser | |
| 6,515,390 B1 | 2/2003 | Lopatinsky et al. | |
| 6,520,737 B1 | 2/2003 | Fischer et al. | |
| 6,548,932 B1 | 4/2003 | Weiglhofer et al. | |
| 6,590,312 B1 | 7/2003 | Seguchi et al. | |
| 6,603,232 B2 | 8/2003 | Van Dine et al. | |
| 6,617,747 B1 | 9/2003 | Petersen | |
| 6,629,358 B2 | 10/2003 | Setiabudi et al. | |
| 6,664,692 B1 | 12/2003 | Kristoffersen | |
| 6,676,122 B1 | 1/2004 | Wobben | |
| 6,683,397 B2 | 1/2004 | Gauthier et al. | |
| 6,700,260 B2 | 3/2004 | Hsu et al. | |
| 6,700,288 B2 | 3/2004 | Smith | |
| 6,707,224 B1 | 3/2004 | Petersen | |
| 6,720,688 B1 | 4/2004 | Schiller | |
| 6,727,624 B2 | 4/2004 | Morita et al. | |
| 6,744,341 B2 * | 6/2004 | Iwami et al. | 335/284 |
| 6,746,217 B2 | 6/2004 | Kim et al. | |
| 6,759,758 B2 | 7/2004 | Martinez | |
| 6,762,525 B1 | 7/2004 | Maslov et al. | |
| 6,781,276 B1 | 8/2004 | Stiesdal et al. | |
| 6,784,564 B1 | 8/2004 | Wobben | |

| Patent/Pub No. | Date | Inventor |
|---|---|---|
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,903,640 B2 * | 6/2005 | Carrier et al. ............... 335/284 |
| 6,906,444 B2 | 6/2005 | Hattori et al. |
| 6,911,741 B2 | 6/2005 | Petteersen et al. |
| 6,921,243 B2 | 7/2005 | Canini et al. |
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,084,522 B2 * | 8/2006 | Wobben ............... 290/55 |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,687,932 B2 | 3/2010 | Casazza et al. |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082839 A1 | 4/2005 | McCoin |
| 2005/0230979 A1 | 10/2005 | Bywaters et al. |
| 2005/0231314 A1 * | 10/2005 | Haisch ............... 335/284 |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0097582 A1 * | 5/2006 | Engstrom ............... 310/10 |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0159281 A1 * | 7/2007 | Li et al. ............... 335/284 |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0129129 A1 * | 6/2008 | Kori et al. ............... 310/58 |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0243774 A1 * | 10/2009 | Aoki et al. ............... 335/284 |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |
| 2010/0123318 A1 | 5/2010 | Casazza et al. |
| 2011/0006865 A1 * | 1/2011 | Hemmelmann et al. ...... 335/284 |
| 2011/0037545 A1 * | 2/2011 | Sivasubramaniam et al. ............... 335/216 |

FOREIGN PATENT DOCUMENTS

| | | |
|---|---|---|
| CN | 1554867 | 12/2004 |
| DE | 1130913 | 6/1962 |
| DE | 2164135 | 7/1973 |
| DE | 2322458 | 11/1974 |
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |

| | | | | | | |
|---|---|---|---|---|---|---|
| DE | 4402184 | 8/1995 | | JP | 57059462 | 4/1982 |
| DE | 4415570 | 11/1995 | | JP | 3145945 | 6/1991 |
| DE | 4444757 | 6/1996 | | JP | 5122912 | 5/1993 |
| DE | 29706980 | 7/1997 | | JP | 6002970 | 1/1994 |
| DE | 19636591 | 3/1998 | | JP | 6269141 | 9/1994 |
| DE | 19644355 | 4/1998 | | JP | 10-070858 | 3/1998 |
| DE | 19652673 | 6/1998 | | JP | 11236977 | 8/1999 |
| DE | 19711869 | 9/1998 | | JP | 11-299197 | 10/1999 |
| DE | 19748716 | 11/1998 | | JP | 2000-134885 | 5/2000 |
| DE | 29819391 | 2/1999 | | JP | 2001-057750 | 2/2001 |
| DE | 19801803 | 4/1999 | | JP | 2003453072 | 7/2003 |
| DE | 19932394 | 1/2001 | | JP | 2004-153913 | 5/2004 |
| DE | 19947915 | 4/2001 | | JP | 2004-297947 | 10/2004 |
| DE | 19951594 | 5/2001 | | JP | 2005-006375 | 1/2005 |
| DE | 10000370 | 7/2001 | | JP | 2005-020906 | 1/2005 |
| DE | 20102029 | 8/2001 | | JP | 2005-312150 | 11/2005 |
| DE | 10219190 | 11/2003 | | NL | 8902534 | 5/1991 |
| DE | 10246690 | 4/2004 | | RU | 2000466 | 9/1993 |
| DE | 102004018524 | 11/2005 | | RU | 2229621 | 5/2004 |
| DE | 102004028746 | 12/2005 | | WO | WO8402382 | 6/1984 |
| EP | 0013157 | 7/1980 | | WO | WO9105953 | 5/1991 |
| EP | 0232963 | 8/1987 | | WO | WO9212343 | 7/1992 |
| EP | 0313392 | 4/1989 | | WO | WO9730504 | 8/1997 |
| EP | 0627805 | 12/1994 | | WO | WO9733357 | 9/1997 |
| EP | 1108888 | 6/2001 | | WO | WO9840627 | 9/1998 |
| EP | 1167754 | 1/2002 | | WO | WO9930031 | 6/1999 |
| EP | 1289097 | 3/2003 | | WO | WO9933165 | 7/1999 |
| EP | 1291521 | 3/2003 | | WO | WO9937912 | 7/1999 |
| EP | 1309067 | 5/2003 | | WO | WO9939426 | 8/1999 |
| EP | 1363019 | 11/2003 | | WO | WO0001056 | 1/2000 |
| EP | 1375913 | 1/2004 | | WO | WO0106121 | 1/2001 |
| EP | 1394406 | 3/2004 | | WO | WO0106623 | 1/2001 |
| EP | 1394451 | 3/2004 | | WO | WO0107784 | 2/2001 |
| EP | 1589222 | 10/2005 | | WO | WO0121956 | 3/2001 |
| EP | 1612415 | 1/2006 | | WO | WO0125631 | 4/2001 |
| EP | 1641102 | 3/2006 | | WO | WO0129413 | 4/2001 |
| EP | 1677002 | 7/2006 | | WO | WO0134973 | 5/2001 |
| EP | 1772624 | 4/2007 | | WO | WO0135517 | 5/2001 |
| EP | 1780409 | 5/2007 | | WO | WO0169754 | 9/2001 |
| EP | 1829762 | 9/2007 | | WO | WO0233254 | 4/2002 |
| EP | 1921311 | 5/2008 | | WO | WO02057624 | 7/2002 |
| EP | 2060786 | 5/2009 | | WO | WO02083523 | 10/2002 |
| ES | 2140301 | 2/2000 | | WO | WO03036084 | 5/2003 |
| FR | 806292 | 12/1936 | | WO | WO03067081 | 8/2003 |
| FR | 859844 | 12/1940 | | WO | WO03076801 | 9/2003 |
| FR | 1348765 | 1/1964 | | WO | WO2004017497 | 2/2004 |
| FR | 2401091 | 3/1979 | | WO | WO2005103489 | 11/2005 |
| FR | 2445053 | 7/1980 | | WO | WO2006013722 | 2/2006 |
| FR | 2519483 | 7/1983 | | WO | WO2006032515 | 3/2006 |
| FR | 2594272 | 8/1987 | | WO | WO2007063370 | 6/2007 |
| FR | 2760492 | 9/1998 | | WO | WO2007110718 | 10/2007 |
| FR | 2796671 | 1/2001 | | WO | WO2008052562 | 5/2008 |
| FR | 2798168 | 3/2001 | | WO | WO2008078342 | 7/2008 |
| FR | 2810374 | 12/2001 | | WO | WO2008086608 | 7/2008 |
| FR | 2882404 | 8/2006 | | WO | WO2008098573 | 8/2008 |
| GB | 191317268 | 3/1914 | | WO | WO2008102184 | 8/2008 |
| GB | 859176 | 1/1961 | | WO | 2008/116464 * | 10/2008 |
| GB | 1524477 | 9/1978 | | WO | WO2008116463 | 10/2008 |
| GB | 1537729 | 1/1979 | | WO | WO2008131766 | 11/2008 |
| GB | 2041111 | 9/1980 | | | | |
| GB | 2050525 | 1/1981 | | | | |
| GB | 2075274 | 11/1981 | | | | |
| GB | 2131630 | 6/1984 | | | | |
| GB | 2144587 | 3/1985 | | | | |
| GB | 2208243 | 3/1989 | | | | |
| GB | 2266937 | 11/1993 | | | | |
| GB | 2359417 * | 8/2001 | | | | |
| GB | 2372783 | 9/2002 | | | | |

OTHER PUBLICATIONS

Variable Speed Gearless Wind Turbine (website), http://www.mhi.cojp/msmw/mw/en/gearless.html, viewed on Sep. 22, 2006.
Italian Search Report dated May 11, 2010 for IT MI20091443.

* cited by examiner

METHOD AND APPARATUS FOR ACTIVATING AN ELECTRIC MACHINE, AND ELECTRIC MACHINE

PRIORITY CLAIM

This application claims the benefit of and priority to Italian Patent Application No. MI2009A 001443, filed on Aug. 7, 2009, the entire contents of which are incorporated by reference herein.

BACKGROUND

Known electric machines comprises a stator, and a rotor which rotates about an axis with respect to the stator.

In these known electric machines, the stator comprises an outer cylinder, and stator segments arranged about the axis. The rotor comprises an inner cylinder, and rotor segments arranged about the axis; and each rotor segment comprises modules made of magnetizable material and arranged, parallel to the axis, inside the rotor segment.

To activate such known electric machines, the modules of magnetizable material must be magnetized (i.e., a material or object that produces a magnetic field). More specifically, each module of magnetizable material is made of material that can be magnetized to produce a magnetic field. This is done by adopting an electric machine activating method, which comprises a module magnetizing step, after and by virtue of which each module produces a magnetic field and is known as a magnetized module.

The magnetizing step is performed by a magnetizing device, which magnetizes the modules of magnetizable material with magnetizing flux of a given strength.

The strength of the magnetic field produced by each module changes, in particular gets weaker, over the working life of the module, so that, after a certain time period, normally ranging between ten and twenty years, each module is no longer capable of producing a magnetic field capable of effectively interacting with the magnetic field produced by the stator, with the result that the machine is no longer active, and must therefore be reactivated by remagnetizing the modules. This involves further magnetization of the previously magnetized modules, which, once remagnetized, define magnetized modules in all respects.

Such known electric machines are typically activated by: magnetizing each module; fitting each magnetized module to the inner cylinder of the rotor; fitting the stator segments to the stator; and connecting the rotor, with the magnetized modules, to the stator with one or more bearings.

However, this known method poses the technical problem of having to handle each magnetized module, which is a dangerous job on account of the module generating strong forces which interact with other modules or ferromagnetic parts. That is, when fitting each magnetized module to the rotor, the magnetized modules already fitted to the rotor interact with the one being assembled. For this reason, the magnetized modules must be assembled using special tools and in premises designed for the job. More specifically, in the case of an electric machine that has never been operated, the magnetizing step is performed at the factory; whereas, if the electric machine forms part of a system and needs reactivating, it must be dismantled from the system and sent to the factory, and each module or group of modules must be removed, and each group of modules remagnetized. This is obviously a long, painstaking procedure involving numerous man-hours and considerable cost, and which also calls for transporting an electric machine with the rotor magnetized.

SUMMARY

The present disclosure relates to a method and apparatus for activating an electric machine, and to an electric machine.

It is an object of the present disclosure to provide a method of activating an electric machine, configured to eliminate certain of the above-described drawbacks of known electric machines.

According to one embodiment of the present disclosure, there is provided a method of activating an electric machine; the electric machine comprising a stator, and a rotor which rotates about a first axis with respect to the stator; the stator comprising a plurality of stator segments arranged about the first axis; the rotor comprising modules made of magnetizable material and arranged about the first axis; and the method comprising the steps of connecting the rotor to the stator by a bearing; and magnetizing said modules of magnetizable material when the rotor is connected to the stator.

In the method according to the present disclosure, the electric machine is activated by magnetizing the modules after the rotor is fitted to the stator, thus eliminating problems posed by handling magnetized modules. Moreover, according to the present disclosure, the magnetizing step is performed after almost all the stator segments have been fitted to the outer cylinder (i.e., it need not necessarily be carried out at the factory, and may be performed after the electric machine is installed, for example, in the nacelle of a wind power turbine, or in a cable transportation system).

The present disclosure also avoids transporting the electric machine with the rotor magnetized. In fact, the electric machine can be fitted with the non-magnetized rotor and part of the stator comprising almost all the stator segments, and be activated, by magnetizing the rotor, after it is installed, thus eliminating any interacting forces when assembling or transporting the electric machine.

The present disclosure also allows the electric machine to be reactivated by remagnetizing the rotor directly on the system in which the electric machine is installed, thus saving time with respect to known electric machines.

Another object of the present disclosure is to provide an apparatus for activating an electric machine, configured to eliminate certain of the above-described drawbacks of known electric machines.

According to one embodiment of the present disclosure, there is provided an apparatus for activating an electric machine; the apparatus comprising a magnetizing device, and a frame for fitting the magnetizing device to a stator of the electric machine; and the frame being configured for insertion inside a seat of the stator, in place of at least one stator segment.

The present disclosure provides the activating apparatus capable of activating the electric machine after the rotor is fitted to the stator, and also allows the electric machine to be reactivated directly on the system in which it is installed, without having to dismantle and transport it to a factory specially equipped for the job.

Another object of the present disclosure is to provide an electric machine configured to eliminate certain of the above-described drawbacks of known electric machines.

According to one embodiment of the present disclosure, there is provided an electric machine comprising a stator, and a rotor which rotates about a first axis with respect to the stator; the stator comprising a plurality of stator segments arranged about the first axis; the rotor comprising modules made of magnetizable material and arranged about the first axis; the stator being configured to temporarily house a magnetizing device, for magnetizing the modules of magnetizable material of the rotor, inside a seat configured for at least one of the stator segments; the rotor being connected to the stator by a single bearing; and the magnetizing device being insertable externally from the opposite side to the bearing.

The present disclosure provides an electric machine that can be activated after it is installed in a system.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which.

DETAILED DESCRIPTION

Figure 1:
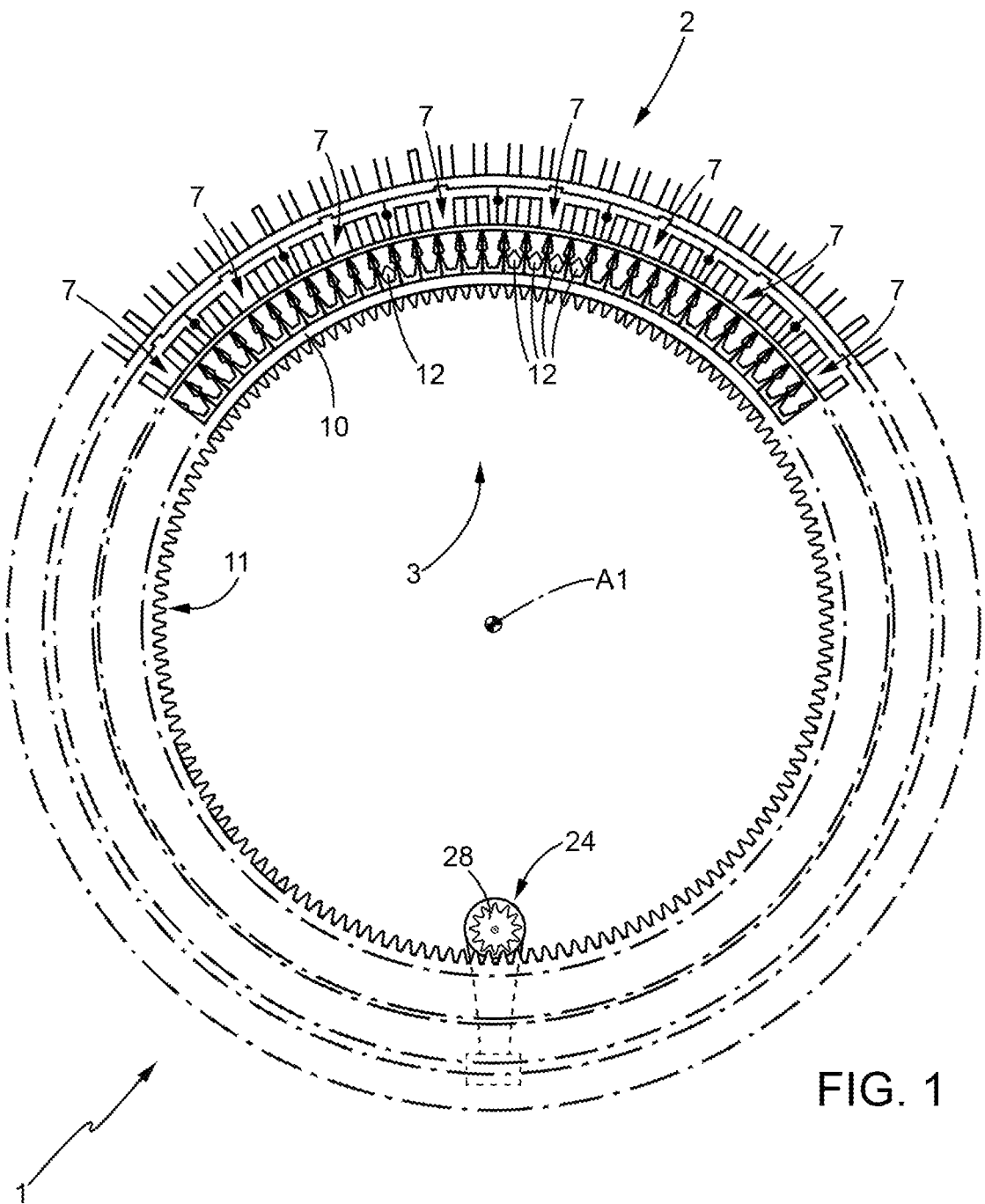
FIG. 1 shows a front view, with parts removed for clarity, of an electric machine activatable using the method according to the present disclosure.
Figure 2:
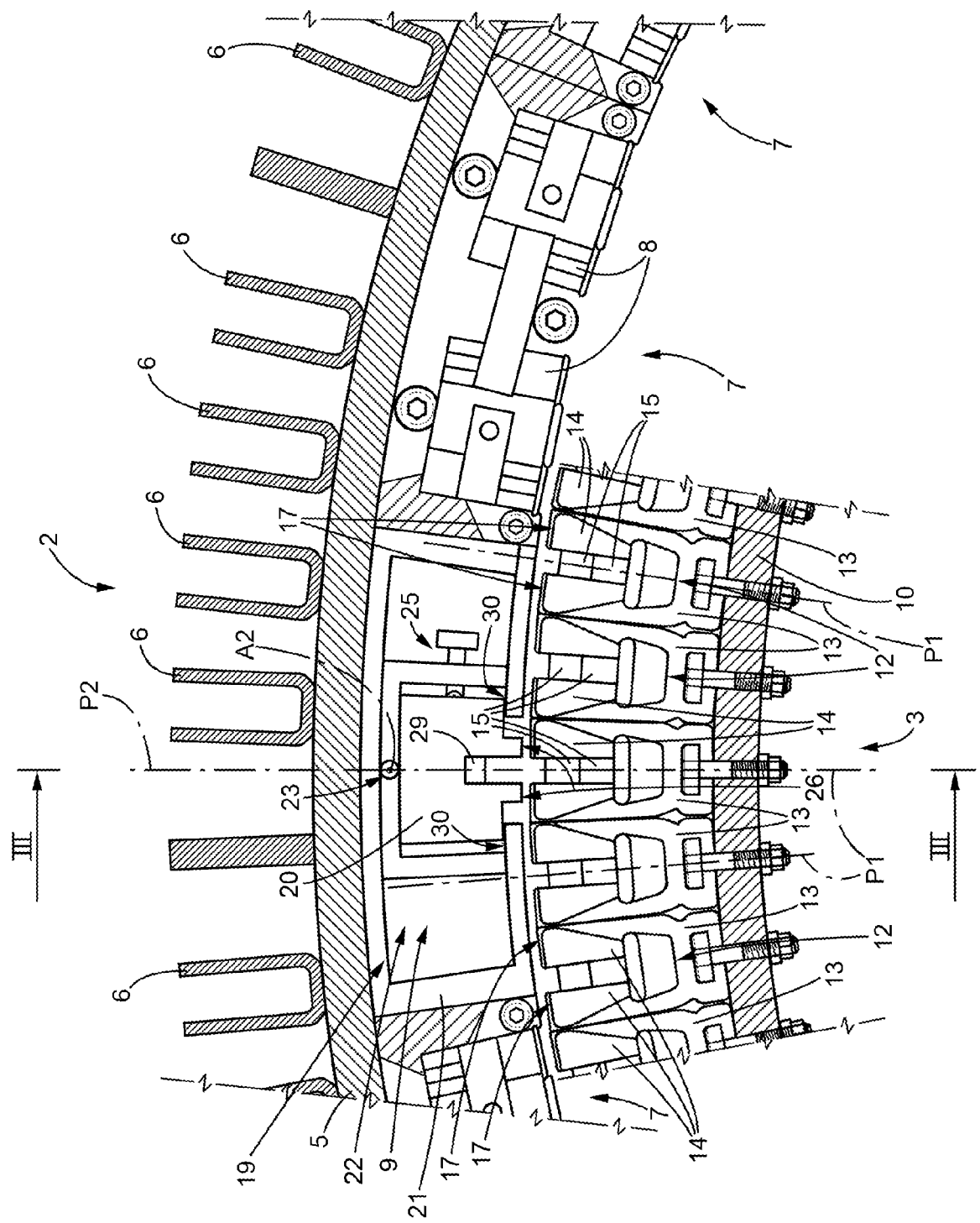
FIG. 2 shows a larger-scale, partly sectioned front view, with parts removed for clarity, of the FIG. 1 electric machine, and an electric machine activating apparatus in accordance with the present disclosure.
Figure 3:
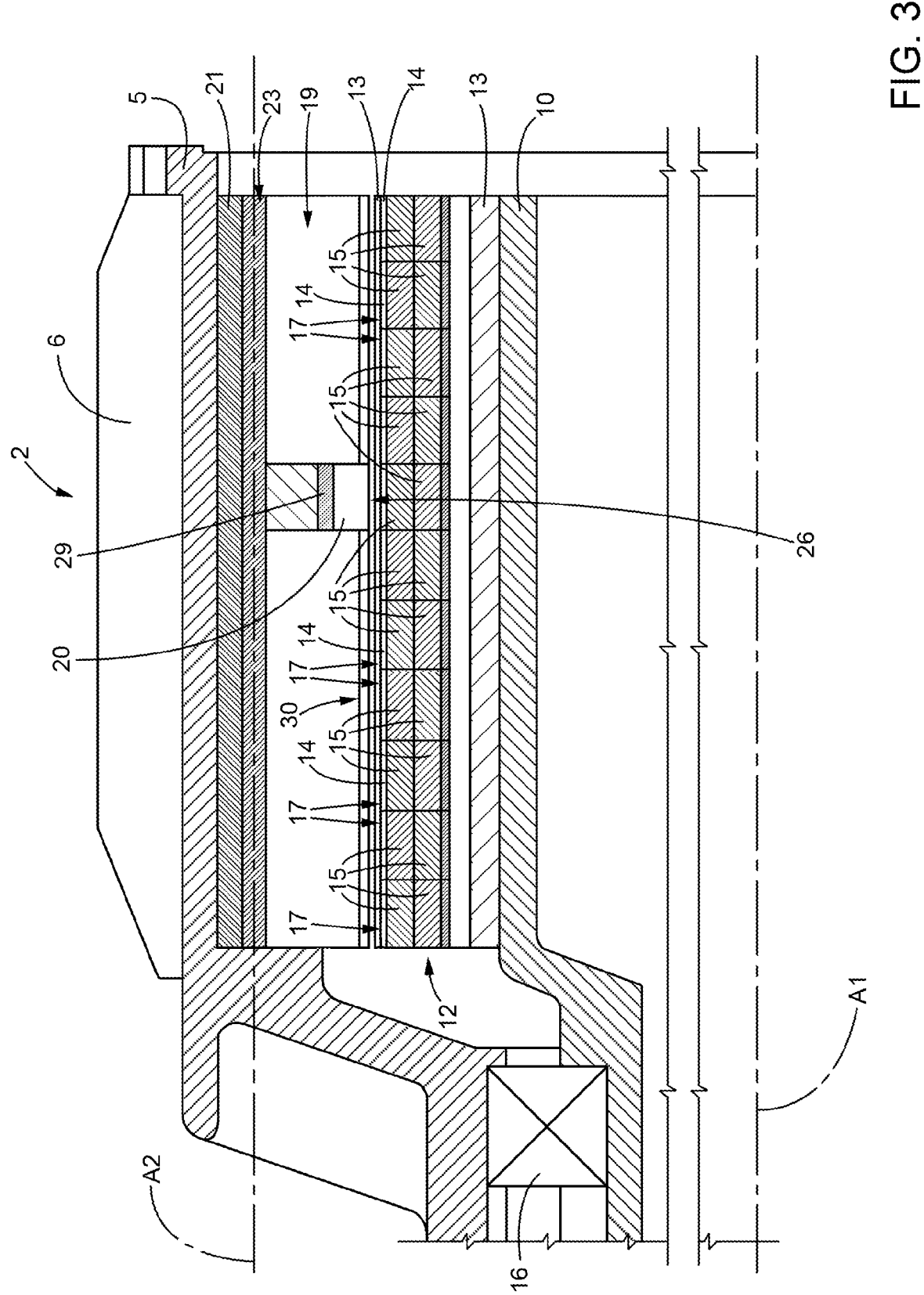
FIG. 3 shows a larger-scale section, with parts removed for clarity, of a detail in FIG. 2.

Referring now to the example embodiments of the present disclosure illustrated in FIGS. 1 to 3, number 1 in FIG. 1 indicates an electric machine.

In the example shown, electric machine 1 may be an electric generator, such as used on a wind power system for producing electric power, or an electric motor, such as used on a cable transportation system.

Electric machine 1 comprises a stator 2; and a hollow rotor 3 which rotates about an axis A1 with respect to stator 2.

With reference to FIG. 2, stator 2 comprises an outer cylinder 5; cooling fins 6 fixed to the outer face of outer cylinder 5; and a plurality of stator segments 7 arranged about axis A1 (FIG. 1) and fixed to the inner face of outer cylinder 5 by fastening devices (not shown in the drawings).

Cooling fins 6 cool outer cylinder 5 and therefore stator 2. More specifically, cooling fins 6 and outer cylinder 5 are made of heat-conducting material, so that the Joule-effect or other types of heat produced inside stator 2 is transferred to outer cylinder 5, and from this to cooling fins 6, by which it is dissipated.

Outer cylinder 5 therefore covers, protects, and supports stator segments 7.

Each stator segment 7 comprises windings wound about packs of stator laminations 8, so that each stator segment 7 can be extracted from stator 2 without interacting with the other stator segments 7.

With reference to FIG. 1, rotor 3 comprises an inner cylinder 10; a gear 11; and rotor segments 12 arranged about axis A1.

With reference to FIG. 2, each rotor segment 12 comprises a gripper 13; magnetic guides 14; modules 15 of magnetizable material; and bolts.

With reference to FIG. 3, inner cylinder 10 is connected by a bearing 16 to outer cylinder 5 of stator 2. In one such embodiment, electric machine 1 comprises only one bearing 16.

With reference to FIG. 2, modules 15 of magnetizable material are arranged about axis A1.

In each rotor segment 12, modules 15 of magnetizable material are arranged in groups. More specifically, each group of modules 15 comprises two modules 15 arranged radially with respect to axis A1 (FIG. 1). As shown in FIG. 3, the groups of modules 15 are arranged parallel to axis A1 along the whole of rotor segment 12.

In the non-limiting example shown, though not necessarily, each rotor segment 12 comprises eleven groups of modules 15.

With reference to FIG. 2, each module 15 has a plane of symmetry P1; the two modules 15 in each group have coincident planes of symmetry P1; and the modules 15 in each rotor segment 12 also have coincident planes of symmetry P1.

Each group of modules 15 is located between a respective pair of magnetic guides 14 defined by two packs of rotor laminations (i.e., each group of modules 15 is located between two packs of rotor laminations), so each rotor segment 12 comprises eleven pairs of magnetic guides 14. Each pair of magnetic guides 14 is located inside gripper 13, is bolted to inner cylinder 10, has two faces 17 and, in use, is traversed by, and orients magnetic flux coupled to modules 15 of magnetizable material.

Modules 15 are made of material that can be magnetized by a magnetizing process, and which normally comprises rare-earth chemical elements, such as samarium-cobalt or neodymium-ferroboron, and metals. It is understood, however, that the protective scope of the present disclosure also covers any module 15 made of material that can be magnetized by a magnetizing process.

Electric machine 1, be it a generator or motor, must be activated (i.e., must have a magnetized rotor 3 to produce a magnetic field) and thus modules 15 of rotor 3 must be magnetized.

According to one embodiment of the present disclosure, there is provided an apparatus 19 for activating electric machine 1, and which comprises a magnetizing device 20; a frame 21; and a precision positioning system 22 fitted to frame 21, magnetizing device 20, and rotor 3.

More specifically, precision positioning system 22 comprises a precision axial feed device 23 fitted to frame 21; a precision rotation device 24 (FIG. 1) fitted to rotor 3 and stator 2; and a fine-adjustment device 25 fitted to frame 21.

With reference to FIG. 2, to activate electric machine 1, activating apparatus 19 is positioned partly inside stator 2. More specifically, magnetizing device 20, frame 21, precision axial feed device 23, and fine-adjustment device 25 are inserted inside a seat 9 of stator 2 configured to house one of stator segments 7.

In other words, in the illustrated embodiment, when activating electric machine 1, all the stator segments 7 of stator 2 except one are assembled, so that the seat of the unassembled stator segment 7 defines seat 9, in which to insert magnetizing device 20, frame 21, and part of precision positioning system 22.

It is understood, however, that the protective scope of the present disclosure also extends to leaving two or more stator segments 7 unassembled.

In an alternative embodiment (not shown) of the present disclosure, seat 9 is configured to house any number of stator segments 7 more than one; in which case, when activating the electric machine, all the stator segments 7 except a designated number are assembled.

With reference to FIG. 2, frame 21 is inserted inside stator 2. More specifically, it is fixed to outer cylinder 5 of stator 2 by fastening devices (not shown), and is substantially the same size as seat 9.

Frame 21 supports and surrounds magnetizing device 20 which, in use, faces one of rotor segments 12.

Each rotor segment 12, as stated, comprises modules 15 arranged parallel to axis A1 (FIG. 1). Internally, magnetizing device 20 comprises at least one coil (not shown) which generates magnetizing flux to magnetize modules 15; and inner magnetic guides (not shown) which conduct the magnetizing flux outwards. And externally, magnetizing device 20 has two faces 26, through which the magnetizing flux travels, and which, in use, must completely face the two faces 17 of a pair of magnetic guides 14 to conduct the magnetizing flux effectively to modules 15 located between the pair of magnetic guides 14.

Faces 26 of magnetizing device 20 are symmetric with respect to a plane of symmetry P2 of magnetizing device 20.

With reference to FIG. 3, precision axial feed device 23 substantially extends along an axis A2 parallel to axis A1, moves magnetizing device 20 parallel to axis A2 to position faces 26 of magnetizing device 20 completely facing faces 17 of pairs of magnetic guides 14 of successive modules 15, and comprises a screw-nut screw system configured to permit precise movement of magnetizing device 20, and to withstand the extremely strong interacting forces produced when magnetizing device 20 generates magnetic flux to magnetize modules 15.

After magnetizing all the modules 15 of one rotor segment 12, magnetizing device 20 must be positioned facing another rotor segment 12 with modules 15 to be magnetized. To do this, as shown in FIG. 1, rotor 3 is rotated by precision rotation device 24, which meshes with gear 11 fixed to rotor 3. With reference to FIG. 1, precision rotation device 24 comprises a pinion 28 which is connected to stator 2, meshes with gear 11 fitted to rotor 3, and is controlled by a motor and a control unit (not shown in the drawings). Rotation of rotor 3 can thus be controlled, when activating electric machine 1, to position magnetizing device 20 completely facing one of stator segments 12 (FIG. 2).

With reference to FIG. 2, fine-adjustment device 25 comprises an adjusting system with articulated arms, which provides for moving magnetizing device 20 crosswise to axis A2 with respect to frame 21. More specifically, magnetizing device 20 is supported on one side by two supporting faces 30 of frame 21, and on the opposite side by a guide (not shown) fixed to precision axial feed device 23. Supporting faces 30 and the guide curve slightly about axis A1. By the articulated arms, fine-adjustment device 25 thus provides for moving magnetizing device 20 angularly about axis A1 with respect to stator 2, to fine-adjust the position of magnetizing device 20 so that faces 26 of magnetizing device 20 completely face faces 17 of a pair of magnetic guides 14, or to align plane P2 of magnetizing device 20 with plane P1 of the group of modules 15 to be magnetized. Alternatively, fine-adjustment device 25 comprises an arm, and supporting faces 30 and the guide fixed to precision axial feed device 23 are straight, so that the fine-adjustment device moves magnetizing device 20 crosswise to axis A2 with respect to frame 21, and in particular tangentially with respect to stator 2, to fine-adjust the position of magnetizing device 20.

Activating apparatus 19 comprises a temperature sensor 29, which may be of any type, such as a contact temperature sensor or a non-contact (e.g., an infrared) temperature sensor, which determines the temperature of the group of modules 15 to be magnetized.

According to one embodiment of the present disclosure, electric machine 1 described above is activated as follows.

The activating method according to one embodiment of the present disclosure comprises:

(a) connecting inner cylinder 10 of rotor 3 to outer cylinder 5 of stator 2 with bearing 16;

(b) assembling two modules 15 to form the group of modules 15; fitting the group of modules 15 to the respective pair of magnetic guides 14; fitting the pair of magnetic guides to gripper 13; repeating the above operations until gripper 13 comprises eleven groups of modules 15 and eleven respective pairs of magnetic guides; and bolting gripper 13 to inner cylinder 10;

(c) repeating step (b) for each segment 12 of rotor 3, until the whole of inner cylinder 10 of rotor 3 is fitted with rotor segments 12 with modules 15 of magnetizable material;

(d) fitting a number of the plurality of stator segments 7 to outer cylinder 5 with fastening devices, to define seat 9 for housing at least one further stator segment 7, wherein outer cylinder 5 is fitted with all of stator segments 7 except one (the number of the plurality of stator segments 7 equals all the stator segments 7 except one);

(e) inserting part of activating apparatus 19, in particular magnetizing device 20, inside seat 9 from the opposite side to bearing 16; and aligning magnetizing device 20 with a first group of modules 15 (e.g., the group of modules 15 furthest from bearing 16);

(f) rotating rotor 3 in a controlled manner with precision rotation device 24 and/or fine-adjusting the position of magnetizing device 20 with fine-adjustment device 25, to position faces 26 of magnetizing device 20 completely facing faces 17 of a pair of magnetic guides 14 of a rotor segment 12;

(g) determining the temperature of the group of modules 15 with temperature sensor 29;

(h) magnetizing the group of modules 15 of the pair of magnetic guides 14 facing magnetizing device 20;

(i) moving magnetizing device 20 in a direction parallel to axis A2 with precision axial feed device 23, to position the two faces 26 of magnetizing device 20 completely facing two faces 17 of the pair of magnetic guides 14 adjacent to said pair of magnetic guides 14; performing steps (g) and (h); and repeating the operation until all the groups of modules 15 of the rotor segment 12 facing magnetizing device 20 are magnetized;

(l) rotating rotor 3 in controlled manner with precision rotation device 24 and/or fine-adjusting the position of magnetizing device 20 with fine-adjustment device 25, to position faces 26 of magnetizing device 20 completely facing faces 17 of a pair of magnetic guides 14 of a further rotor segment 12 to be magnetized;

(m) repeating steps (g) to (l) to magnetize all the groups of modules 15 of rotor 3;

(n) extracting magnetizing device 20 from seat 9 from the opposite side to bearing 16, and inserting the further stator segment 7 inside seat 9.

Electric machine 1 is thus activated by the above method.

The method also provides for reactivating the activated electric machine 1 by:

(o) extracting one of stator segments 7 from stator 2, on the opposite side to bearing 16, to define the vacant seat 9 of stator 2; and (p) performing steps (e) to (n).

The above method thus provides for reactivating electric machine 1 and remagnetizing rotor 3 directly on the system in which the machine is installed (i.e., with no need to dismantle the machine and transfer it to the factory for remagnetization).

In one variation, the method according to the present disclosure comprises, between steps (g) and (h), the additional step of: temperature-conditioning the group of modules 15 with a temperature conditioning system connected to modules 15, to achieve a suitable magnetization temperature of modules 15.

In one variation of the method according to the present disclosure, step (f) of rotating rotor 3 in controlled manner with precision rotation device 24 and/or fine-adjusting the position of magnetizing device 20 with fine-adjustment device 25 is performed in such a manner as to align plane P2 with plane P1 of at least one of modules 15.

Electric machine 1 described is a radial-flux, buried-permanent-magnet type. It is understood, however, that the scope of the present disclosure also extends to any other type of permanent-magnet electric machine, such as a radial-flux, surface-magnet or axial-flux or cross-flux electric machine.

In an alternative embodiment (not shown in the drawings), the magnetizing device is larger than the one shown in FIG. 2, and simultaneously magnetizes more than one group of modules, such as two groups of modules, or all the groups of modules forming part of the rotor segment or two or more rotor segments. In which case, the faces of the magnetizing device face more than two faces of the pairs of magnetic guides.

In an alternative embodiment (not shown in the drawings), the magnetizing device is housed in a stator seat corresponding to any number of stator segments other than one, e.g. to two, three or more stator segments.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electric machine comprising:
   a stator including a plurality of stator segments arranged about a first axis; and
   a rotor configured to rotate about the first axis with respect to the stator, the rotor including a plurality of modules made of magnetizable material and arranged about the first axis; and
   a single bearing connected to the stator and the rotor;
   the stator configured to house a magnetizing device inside a seat configured for at least one of the stator segments, the magnetizing device configured to magnetize the modules of magnetizable material of the rotor and configured to be inserted externally from an opposite side of the bearing.

2. The electric machine of claim 1, wherein the stator is configured to temporarily house the magnetizing device inside the seat.

3. An electric machine activating apparatus comprising:
   a magnetizing device;
   a frame configured to fit the magnetizing device to a stator of an electric machine, the frame being configured to be inserted inside a seat of the stator in place of at least one stator segment; and
   a precision positioning system having a precision rotation device fitted to a rotor of the electric machine and to the stator and configured to rotate the rotor to position the magnetizing device facing at least one rotor segment of the rotor, said precision rotation device including a precision axial feed device configured to move the magnetizing device in a direction corresponding to an axis and to position the magnetizing device facing at least one module of magnetizable material of the rotor.

4. The electric machine activating apparatus of claim 3, wherein the frame is configured to fit to an outer cylinder of the stator such that the magnetizing device faces a rotor of the electric machine.

5. The electric machine activating apparatus of claim 3, wherein the magnetizing device is supported by the frame, and is configured to magnetize a rotor of the electric machine with magnetizing flux.

6. The electric machine activating apparatus of claim 3, wherein the precision axial feed device includes a screw-nut screw system.

7. The electric machine activating apparatus of claim 3, wherein the precision positioning system includes a fine-adjustment device configured to move the magnetizing device crosswise to the axis with respect to the frame.

8. The electric machine activating apparatus of claim 3, wherein each module has a first plane of symmetry, the magnetizing device has two second faces symmetrical with respect to a second plane of symmetry, and the precision positioning system includes a fine-adjustment device configured to fine-adjust the position of the magnetizing device.

9. The electric machine activating apparatus of claim 8, wherein the fine-adjustment device is configured to fine-adjust the position of the magnetizing device such that the second plane of symmetry coincides with the first plane of symmetry of at least one of the modules.

10. The electric machine activating apparatus of claim 3, which includes a temperature sensor.

11. A method of activating an electric machine including a stator having a plurality of stator segments arranged about a first axis, a rotor including a plurality of modules made of magnetizable material and arranged about the first axis, said rotor configured to rotate about the first axis with respect to the stator, said method comprising:
    connecting the rotor to the stator by a bearing;
    inserting a magnetizing device in a frame;
    inserting the frame inside a seat of the electric machine from the opposite side of the bearing; and
    magnetizing said magnetizable material of the modules when the rotor is connected to the stator.

12. The method of claim 11, which includes fitting each of said modules to the rotor when said modules are each non-magnetized.

13. The method of claim 12, which includes:
    fitting at least two of the plurality of stator segments to an outer cylinder of the stator, to define the seat configured to house at least one further one of the stator segments; and
    inserting the magnetizing device inside the seat.

14. The method of claim 13, wherein the rotor includes rotor segments which include said modules aligned parallel to the first axis, and the method includes magnetizing each module of the rotor segment facing the magnetizing device.

15. The method of claim 13, wherein each of said modules has a first plane of symmetry, the magnetizing device has two second faces symmetrical with respect to a second plane of symmetry, and the method includes positioning the magnetizing device such that the second plane of symmetry coincides with the first plane of symmetry of at least one of the modules.

16. The method of claim 13, wherein the rotor includes a plurality of pairs of magnetic guides having respective first faces and configured to conduct a magnetic flux coupled to the respective modules by the first faces, the magnetizing device having two second faces, and providing magnetizing flux via the second faces, and the method includes positioning the magnetizing device such that the second faces of the magnetizing device face the first faces of at least one of the pairs of magnetic guides.

17. The method of claim 16, which includes moving the magnetizing device along the rotor segment in a direction parallel to the first axis, such that the second faces of the magnetizing device face the first faces of at least one further pair of the magnetic guides.

18. The method of claim 16, which includes rotating the rotor to position the magnetizing device facing a further one of the rotor segments to be magnetized.

19. The method of claim 16, which includes fine-adjusting the position of the magnetizing device by moving the magnetizing device angularly or tangentially with respect to the stator.

20. The method of claim 13, which includes:
extracting the magnetizing device from the seat, and inserting the further one of the stator segments inside the seat.

21. The method of claim 11, which includes controlling the temperature of the modules at least when magnetizing the modules.

22. The method of claim 11, which includes simultaneously magnetizing a plurality of the modules.

23. A method of activating an electric machine, said method comprising:
connecting a rotor to a stator, the rotor configured to rotate about a first axis with respect to the stator,
the rotor including:
(a) a plurality of modules made of magnetizable material, said plurality of modules:
(i) arranged about the first axis, and
(ii) fitted to the rotor when said modules are each non-magnetized, and
(b) a plurality of pairs of magnetic guides, each having respective first faces configured to conduct a magnetic flux coupled to said respective modules by the first faces,
the stator including a plurality of stator segments arranged about the first axis, wherein at least two of the plurality of stator segments are fitted to an outer cylinder of the stator to define a seat configured to house at least another one of said stator segments;
inserting a magnetizing device inside the seat, the magnetizing device having two second faces configured to provide the magnetizing flux;
positioning the magnetizing device such that the second faces of the magnetizing device face the first faces of at least one of the pairs of magnetic guides;
magnetizing said plurality of modules of magnetizable material when the rotor is connected to the stator; and
moving the magnetizing device along a rotor segment of the rotor in a direction corresponding to the first axis such that the second faces of the magnetizing device face the first faces of at least another one of the plurality of pairs of magnetic guides.

24. The method of claim 23, wherein each of said modules has a first plane of symmetry, the magnetizing device has two second faces symmetrical with respect to a second plane of symmetry and which includes positioning the magnetizing device such that the second plane of symmetry coincides with the first plane of symmetry of at least one of the modules.

25. The method of claim 23, which includes
positioning the magnetizing device such that a second plane of symmetry coincides with a first plane of symmetry of at least one of the modules, wherein each of said modules has the first plane of symmetry and the magnetizing device has two second faces symmetrical with respect to the second plane of symmetry.

26. The method of claim 23, which includes rotating the rotor to position the magnetizing device facing another one of a plurality of rotor segments of the rotor to be magnetized.

27. The method of claim 23, which includes fine-adjusting the position of the magnetizing device by moving the magnetizing device angularly or tangentially with respect to the stator.

28. The method of claim 23, which includes:
extracting the magnetizing device from the seat, and inserting one of the stator segments inside the seat.

29. The method of claim 23, which includes, prior to magnetizing said plurality of modules;
extracting at least one of the stator segments to define the seat and
inserting the magnetizing device inside the seat.

30. The method of claim 23, which includes controlling the temperature of the modules.

31. The method of claim 30, which includes controlling the temperature of the modules at least when magnetizing the modules.

32. The method of claim 23, which includes simultaneously magnetizing a plurality of said modules.

33. The method of claim 23, which includes connecting the rotor to the stator by a bearing.

* * * * *

UNITED STATES PATENT AND TRADEMARK OFFICE
CERTIFICATE OF CORRECTION

| | |
|---|---|
| PATENT NO. | : 8,358,189 B2 |
| APPLICATION NO. | : 12/851782 |
| DATED | : January 22, 2013 |
| INVENTOR(S) | : Thomas Kassner and Alessandro Fasolo |

It is certified that error appears in the above-identified patent and that said Letters Patent is hereby corrected as shown below:

Title Page Item (73) should read:

Assignee: Wilic S.AR.L., Luxembourg (LU)

Signed and Sealed this
Tenth Day of September, 2013

Teresa Stanek Rea
*Acting Director of the United States Patent and Trademark Office*